United States Patent

Takahashi et al.

[11] Patent Number: 6,016,844
[45] Date of Patent: Jan. 25, 2000

[54] GUIDE AND SUPPORT CHAIN FOR FLEXIBLE TUBES

[75] Inventors: Toshio Takahashi; Katsutoshi Shibayama; Tsutomu Iwami; Takayuki Matsuda, all of Osaka-fu, Japan

[73] Assignee: Tsubakimoto Chain Co., Japan

[21] Appl. No.: 09/025,008

[22] Filed: Feb. 17, 1998

[30] Foreign Application Priority Data

Nov. 28, 1997 [JP] Japan ................................ 9-328406

[51] Int. Cl.$^7$ .............................. F16L 11/00; F16G 13/16
[52] U.S. Cl. ........................ 138/120; 138/110; 59/78.1; 248/49
[58] Field of Search ....................... 138/120, 110, 138/155, 118; 285/223, 264, 166; 59/78.1, 900; 248/49

[56] References Cited

U.S. PATENT DOCUMENTS

| Re. 35,579 | 8/1997 | Moritz et al. | 59/78.1 |
|---|---|---|---|
| 3,330,105 | 7/1967 | Weber | 138/120 X |
| 3,772,875 | 11/1973 | Viano | 59/78.1 |
| 3,921,338 | 11/1975 | Loos et al. | 138/106 X |
| 4,570,437 | 2/1986 | Moritz | 59/78.1 |
| 5,038,556 | 8/1991 | Moritz et al. | 59/78.1 |
| 5,724,803 | 3/1998 | Pea | 59/78.1 |
| 5,771,676 | 6/1998 | Komiya et al. | 59/78.1 |
| 5,881,548 | 3/1999 | Takahashi et al. | 59/78.1 |

FOREIGN PATENT DOCUMENTS

| 0384153A | 8/1990 | European Pat. Off. |
|---|---|---|
| 0770793 | 5/1997 | European Pat. Off. |
| 3431531A | 3/1986 | Germany. |
| 29607171 U | 6/1996 | Germany. |
| 29607492 U | 8/1997 | Germany. |

OTHER PUBLICATIONS

European Search Report Appln. No. EP98120389.

*Primary Examiner*—Patrick Brinson
*Attorney, Agent, or Firm*—Woodling, Krost & Rust

[57] ABSTRACT

In a guide and support chain for flexible tubes, noises generated from stoppers and stopper surfaces for maintaining a straight-line attitude, and the rigidity in the case where the straight-line attitude tends to be changed into flexing is improved.

A guide and support chain 10 is constituted such that link parts 12 having a pair of left and right side plates 14, 14 are rotatably connected. A straight-line attitude maintaining stopper and a straight-line attitude maintaining stopper surface comprise first stage straight-line attitude maintaining stoppers 21a, 23a and first straight-line attitude maintaining stopper surfaces 21b, 23b, and a second stage straight-line attitude maintaining stopper 22a and straight-line attitude maintaining stopper surfaces 22b. The stoppers 21a, 23a and the stopper surfaces 21b, 23b are provided at a position small in radius, and the stopper 22a and the stopper surface 22b are provided at a position large in radius. When the stoppers 21a, 23a and the stopper surfaces 21b, 23b start to contact with each other, the stopper 22a is parted from the stopper surface 22b with a predetermined clearance A.

10 Claims, 5 Drawing Sheets

GUIDE AND SUPPORT CHAIN FOR FLEXIBLE TUBES

INDUSTRIAL FIELD

The present invention relates to a chain for storing flexible tubes such as a cable, a hose and the like for supplying energies such as an electric power, a compressed air and the like to a movable machine, and for guiding and supporting the flexible tubes safely and positively while even the movable machine is moving.

Related Art

A conventional guide and support chain has link parts in which upper and lower edges of a pair of left and right side plates are laterally disposed, the side plates of the adjacent link parts being superposed widthwise to each other and rotatably connected, a plurality of link parts connected being formed interiorly thereof with a flexible tube storing space, as disclosed in Japanese Patent Application Laid-Open No. Hei 2-250621. The link part at one end of the guide and support chain is mounted on the movable machine, the link part at the other end of the guide and support chain is mounted on the floor on which the movable machine is installed. In the guide and support chain, a stopper for limiting a rotational angle of the link parts is formed on the side plate of one link part of the adjacent link parts, and a stopper surface in contact with the stopper is formed in the side plate of the other link part of the adjacent link parts When the stopper and the stopper surface come in contact with each other, the link parts are limited in their straight-line attitude and the bending attitude thereof is maintained.

PROBLEM TO BE SOLVED BY THE INVENTION

In such a guide and support chain as described above, when the movable machine moves and the bending attitude and the straight-line attitude are repeated by the link parts, the stopper impinges upon the stopper surface to generate the contact noise. When the moving velocity of the movable machine increases, the contact noise also becomes large. The impingement velocity "v" of the contact surfaces is expressed by $v = r \cdot \omega$, wherein "r" is the average radius from the rotational center to the stopper and stopper surface, and "$\omega$" is the angular velocity at the time of impingement. Since the angular velocity is a function of the moving velocity of the movable machine, when it is made constant, a parameter constituting a factor of the magnitude of the contact noise is the average radius from the rotational center to the stopper and stopper surface.

In the present specification, the term "average radius" is the average of the minimum radius and the maximum radius of the contact surface in the state in which the stopper is in contact with the stopper surface.

In the conventional guide and support chain, no consideration has been taken into the fact that the average radius from the rotational center to the stopper and stopper surface is made small, and the contact noise between the stopper and the stopper surface inevitably increases. Therefore, it is expected that when the guide and support chain is used, a considerable noise is generated. In the conventional guide and support chain, the noise is generated always during the operation of the movable machine, posing a problem in that the working environment is deteriorated.

On the other hand, the average radius from the rotational center to the stopper and stopper surface greatly influences on the rigidity in the case where the bending attitude further tends to be bent and the rigidity in the case where the straight-line attitude tends to be changed into flexing, after the contact between the stopper and the stopper surface. When the average radius is small, the noise becomes small. However, on the other hand, the lowering of the rigidity poses a significant problem. An allowable moment M after the impingement between the stopper and the stopper surface is expressed by $M = F \cdot r$, wherein F is the force exerting between the stopper and the stopper surface. When the exerting force F is constant, the allowable moment M becomes small as the average radius r becomes small. At the part where the average radius r is small, the elastic deformation of the stopper or the stopper surface is large, and the rigidity of the guide and support chain lowers. Then, the moving locus of the guide and support chain is likely to change, thus posing a problem in that the guide and support chain comes in contact with peripheral apparatuses so that the chain itself becomes broken to damage the flexible tube such as a cable, a hose or the like, and a problem in that the peripheral apparatuses are also damaged.

It is an object of the present invention to provide a guide and support chain for flexible tubes, in which noises generated from the stopper and stopper surface which maintain the straight-line attitude are reduced, and the rigidity in the case where the straight-line attitude tends to be changed into flexing is improved.

It is a further object of the present invention to provide a guide and support chain for flexible tubes, in which noises generated from the stopper and stopper surface which limit the bending attitude are reduced, and the rigidity in the case where the bending attitude is further bent is improved.

DESCRIPTION OF REFERENCE NUMERALS

Figure 1:
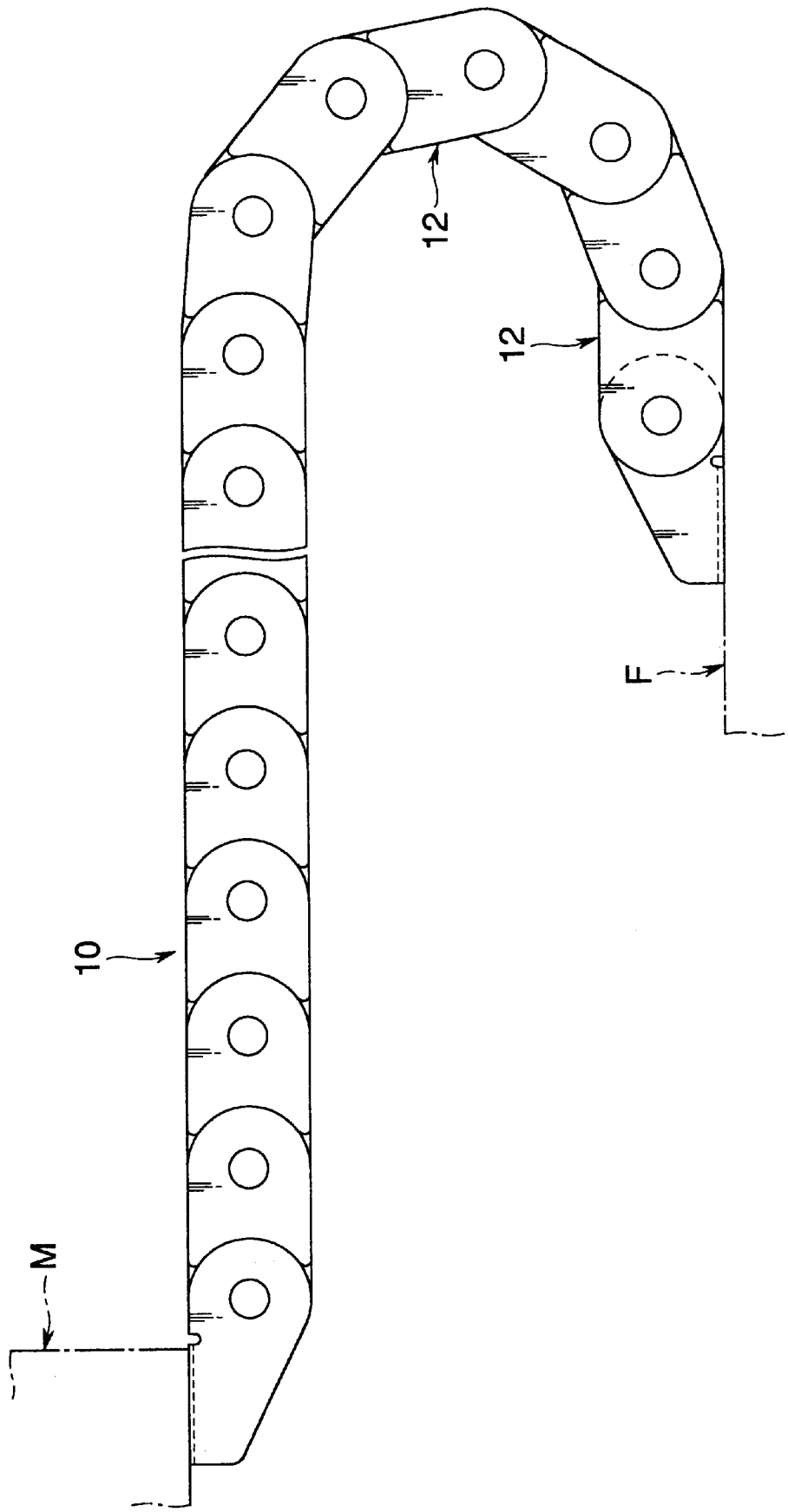
FIG. 1 is a side view showing an example in which a guide and support chain is installed.

F Floor
M Movable machine
10 Guide and support chain
12 Linkpart
14, 15 Side plate
16 Connectingplate
21a, 22a, 23a, 26a, 27a, 28a Straight-line attitude maintaining stopper
21b, 22b, 23b, 26b, 27b, 28b Straight-line attitude maintaining stopper surface
24a, 25a Bending attitude limiting stopper
24b, 25b Bending attitude limiting stopper surface

DETAILED DESCRIPTION OF THE INVENTION
MEANS FOR SOLVING THE PROBLEM

The invention of claim 1 solves the aforementioned problem by providing a guide and support chain having link parts in which upper and lower edges of a pair of left and right side plates are laterally disposed, the side plates of the adjacent link parts being superposed widthwise to each other and rotatably connected, a plurality of link parts connected being formed interiorly thereof with a flexible tube storing space, the side plate of one link part of the adjacent link parts being formed with a straight-line attitude maintaining stopper for maintaining the straight-line attitude of the link parts, the side plate of the other link part of the adjacent link parts being formed with a straight-line attitude maintaining stopper surface in contact with the straight-line attitude maintaining stopper, the side plate of one link part of the adjacent link pants being formed with a bending attitude limiting stopper for limiting the bending attitude of the link parts, the side plate of the other link part of the adjacent link parts being formed with a bending attitude limiting stopper surface in contact with the bending attitude limiting stopper, wherein a first . . . N stages of straight-line attitude maintaining stoppers and straight-line attitude maintaining stopper surfaces are sequentially formed as the radius from the rotational center of the side plates of the adjacent link parts increases, and when tile n-stage straight-line attitude maintaining stopper and straight-line attitude maintaining stopper surface come in contact with each other, a clearance is provided between the n+1 stage straight-line attitude maintaining stopper and the n+1 stage straight-line attitude maintaining stopper surface.

For example, in the guide and support chain formed with only two stages of the straight-line attitude maintaining stoppers and straight-line attitude maintaining stopper surfaces, the first stage straight-line attitude maintaining stopper and the first stage straight-line attitude maintaining stopper surface are formed at a position small in radius from the rotational center of the side plates of the adjacent link parts, and the second stage straight-line attitude maintaining stopper and the second stage straight-line attitude maintaining stopper surface are formed at a position large in radius from the rotational center of the side plates of the adjacent link parts, whereby when the first stage straight-line attitude maintaining stopper and the first stage straight-line attitude maintaining stopper surface come in contact with each other, the clearance is provided between the second stage straight-line attitude maintaining stopper and the second stage straight-line attitude maintaining stopper surface to constitute the guide and support chain for solving the aforementioned problem.

The invention of claim 2 solves the aforementioned problem by providing a guide and support chain having link parts in which upper and lower edges of a pair of left and right side plates are laterally disposed, the side plates of the adjacent link parts being superposed widthwise to each other and rotatably connected, a plurality of link parts connected being formed interiorly thereof with a flexible tube storing space, the side plate of one link part of the adjacent link parts being formed with a straight-line attitude maintaining stopper for maintaining the straight-line attitude of the link parts, the side plate of the other link part of the adjacent link parts being formed with a straight-line attitude maintaining stopper surface in contact with the straight-line attitude maintaining stopper, the side plate of one link part of the adjacent link parts being formed with a bending attitude limiting stopper for limiting the bending attitude of the link parts, the side plate of the other link part of the adjacent link pares being formed with a bending attitude limiting stopper surface in contact with the bending attitude limiting stopper, wherein a first . . . N stages of bending attitude limiting stoppers and bending attitude lining stopper surfaces are sequentially formed as the radius from the rotational center of the side plates of the adjacent link parts increases, and when the n-stage bending attitude limiting stopper and bending attitude limiting stopper surface come in contact with each other, a clearance is provided between the n+1 stage bending attitude limiting stopper and the n+1 stage bending attitude limiting stopper surface.

For example, in the guide and support chain formed with only two stages of the bending attitude limiting stoppers and bending attitude limiting stopper surfaces, the first stage bending attitude limiting stopper and the first stage bending attitude limiting stopper surface are formed at a position small in radius from the rotational center of the side plates of the adjacent link parts, and the second stage bending attitude limiting stopper and the second stage bending attitude limiting stopper surface are formed at a position large in radius from the rotational center of the side plates of the adjacent link parts, whereby when the first stage bending attitude limiting stopper and the first stage bending attitude limiting stopper surface come in contact with each other, the clearance is provided between the second stage bending attitude limiting stopper and the second stage bending attitude limiting stopper surface to constitute the guide and support chain for solving the aforementioned problem.

FUNCTION

In the case where the guide and support chain takes the straight-line attitude between the adjacent link parts, the first stage (the n-th stage) straight-line attitude maintaining stopper and the first stage (the n-th stage) straight-line attitude maintaining stopper surface first come in contact with each other. In that state, the second stage (the n+1th stage) straight-line attitude maintaining stopper is parted from the second stage (the n+1th stage) straight-line attitude maintaining stopper surface with a predetermined clearance. The average radius of the contact surface between the first stage straight-line attitude maintaining stopper and the first stage straight-line attitude maintaining stopper surface is smaller than the average radius of the contact surface between the second stage straight-line attitude maintaining stopper and the second stage straight-line attitude maintaining stopper surface, and the impingement velocity ($v = r \cdot \omega$) when the first stage straight-line attitude maintaining stopper and the first stage straight-line attitude maintaining stopper surface come in contact with each other is small in proportion to the average radius. Accordingly, the noise when the first stage straight-line attitude maintaining stopper and the first stage straight-line attitude maintaining stopper surface come in contact with each other is reduced.

The first stage straight-line attitude maintaining stopper and the first stage straight-line attitude maintaining stopper surface start the elastic deformation. Under the condition that the force exerting on the contact surface is large, the clearance between the second stage straight-line attitude maintaining stopper and the second stage straight-line attitude maintaining stopper surface disappears due to the elastic deformation produced in said contact surface. Then, the second stage straight-line attitude maintaining stopper and the second stage straight-line attitude maintaining stopper surface come in contact with each other. In this state, the flexure of the adjacent link parts is limited by the contact between the first stage straight-line attitude maintaining stopper and the first stage straight-line attitude maintaining stopper surface and between the second stage straight-line attitude maintaining stopper and the second stage straight-line attitude maintaining stopper surface.

The average radius of tie contact surface between the second stage straight-line attitude maintaining stopper and the second stage straight-line attitude maintaining stopper surface is larger than the average radius of the contact surface between the first stage straight-line attitude maintaining stopper and the first stage straight-line attitude maintaining stopper surface. Accordingly, this contact surface can allow a large moment without being accompanied by a large elastic deformation, and the rigidity of the guide and support chain in the straight-line attitude is promoted.

With respect to the setting of the clearance between the second stage straight-line attitude maintaining stopper and the second stage straight-line attitude maintaining stopper surface, the optimal value is determined according to the Young's modulus of elasticity peculiar to material of the side plate, the average radius in the contact surface between the first stage straight-line attitude maintaining stopper and the first stage straight-line attitude maintaining stopper surface, and the like. It also differs with the shape of the contact surface.

Indeed, the rigidity of the guide and support chain can be promoted by promptly starting the contact between the second stage straight-line attitude maintaining stopper and the second stage straight-line attitude maintaining stopper surface. Accordingly, preferably, the clearance between the second stage straight-line attitude maintaining stopper and the second stage straight-line attitude maintaining stopper surface is made small. For example, by setting said clearance to the amount of elastic deformation corresponding to the shock which exerts on the first stage straight-line attitude maintaining stopper and the first stage straight-line attitude maintaining stopper surface, the guide and support chain can maintain the predetermined rigidity immediately after contact between the first stage straight-line attitude maintaining stopper and the first stage straight-line attitude maintaining stopper surface.

While in the above-described function, a description has been made of the guide and support chain comprising the first and second stage straight-line maintaining stoppers and the straight-line maintaining stopper surfaces with N=2, it is to be noted apparently that the guide and support chain can be constituted so that the straight-line attitude maintaining stoppers and the straight-line attitude maintaining stopper surfaces close to the rotational center may be placed in contact with each other sequentially stepwise with the time shifted with N in excess of 3.

Further, while a description has been made of the stoppers and stopper surfaces for maintaining the adjacent link parts in the straight-line attitude, the same is true for the case where the adjacent link parts limit the bending attitude.

EMBODIMENTS

Embodiments of the present invention will be described with reference to the drawings. FIG. 1 shows an example of using a guide and support chain according to the present invention. A guide and support chain 10 is constituted by a plurality of link parts 12 rotatably connected. The guide and support chain 10 has one end mounted on a processing device which requires an electric power and a compressed air. This processing device comprises, for example, a movable machine M which moves along the rail. The guide and support chain 10 is to protect and guide, even if the movable machine M moves, a cable or a hose for supplying an electric power and a compressed air thereto, and is interiorly continuously formed wit a space for storing these flexible tubes.

The guide and support chain 10 has the other end mounted on a floor F on which the movable machine is installed. When the movable machine M moves, the guide and support chain 10 takes a straight-line attitude and a bending attitude.

Figure 2:
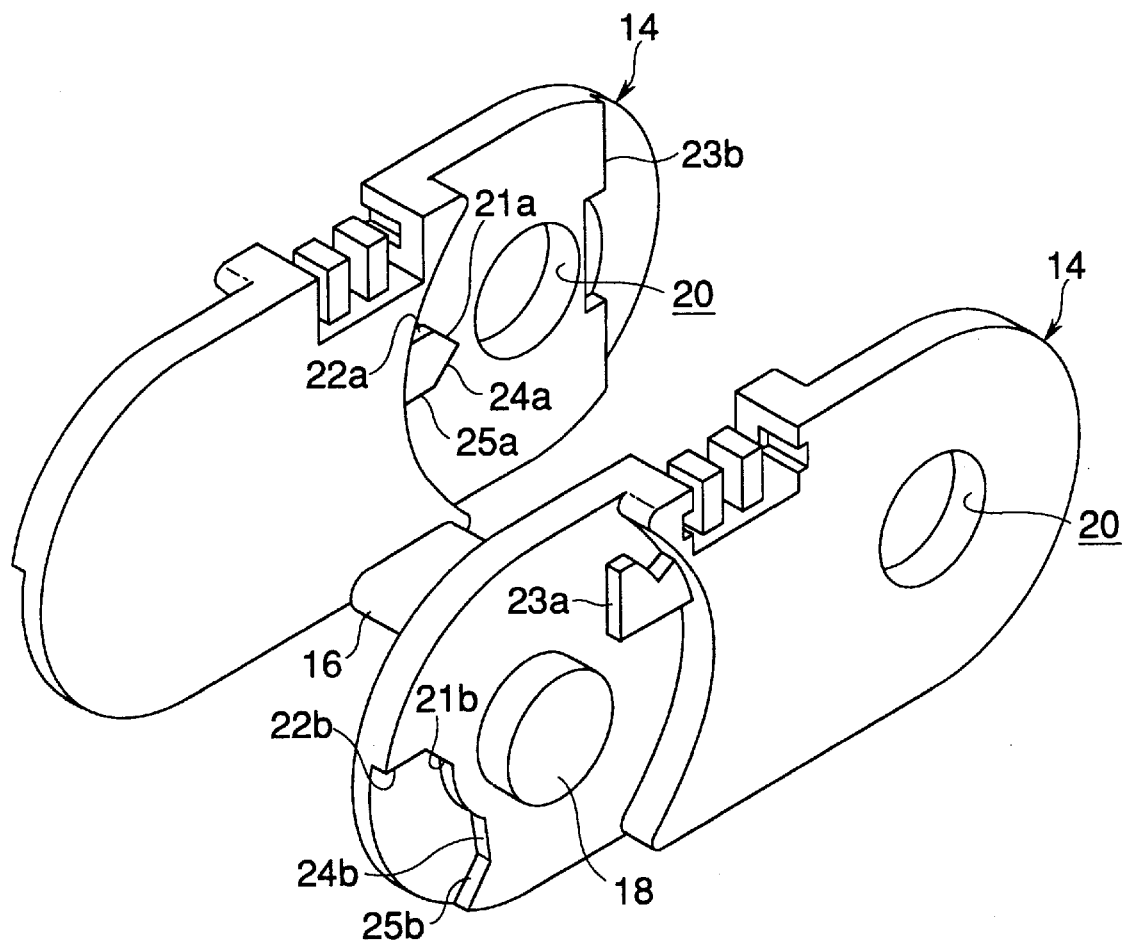
FIG. 2 is a perspective view of a link part of a first embodiment of the guide and support chain.

FIG. 2 shows a link part 12 constituting the guide and support chain 10. The link part 12 has a pair of left and right side plates 14, 14. The side plates 14, 14 have their upper edges and lower edges laterally disposed by a connecting plate 16. The side plates 14, 14 and the connecting plate 16 constituting the link part 12 are made of resin. The connecting plate (not shown) for the upper edge can be detachably mounted on the pair of left and right side plates 14, 14. The connecting plate 16 for the lower edge is formed integral with the pair of left and right side plates 14, 14. When the connecting plate for the upper edge is removed, the flexible tube is stored in the guide and support chain.

Straight-line attitude maintaining stoppers 21a, 22a are provided internally of the other end of the left and night side plates 14, 14. The straight-line attitude maintaining stoppers 21a, 22a are projected from the internal sides. A straight-line attitude maintaining stopper 23a is further provided on the external side of one end of the left and right side plates 14, 14. The straight-line attitude maintaining stopper 23a is projected from the external side.

Straight-line attitude maintaining stopper surfaces 21b, 22b are provided externally of one end of the left and right side plates 14, 14. The straight-line attitude maintaining stopper surfaces 21b, 22b are depressed from the external sides. A straight-line attitude maintaining stopper surface 23b is further provided on the internal side of the other end of the left and right side plates 14, 14. The straight-line attitude maintaining stopper surface 23b is depressed from the internal side.

In the case where the adjacent link parts 12, 12 are connected, the straight-line maintaining stoppers 21a, 22a, 23a and the straight-line attitude maintaining stopper surfaces 21b, 22b, 23b come in contact with each other to thereby prevent the adjacent link parts 12, 12 from being rotated in excess of the straight-line attitude.

The straight-line maintaining stopper comprises two first-stage straight-line attitude maintaining stoppers 21a, 23a, and one second-stage straight-line maintaining stopper 22a. The straight-line attitude maintaining stopper surface comprises two first-stage straight-lie attitude maintaining stopper surfaces 21b, 23b, and one second-stage straight-line maintaining stopper surface 22b. The first-stage straight-line attitude maintaining stoppers 21a, 23a are provided at a position small in a radial direction from the rotational center of the adjacent link parts 12, 12, and the second-stage straight-line attitude maintaining stopper 22a is provided at a position large in a radial direction from said rotational center. The first-stage straight-line attitude maintaining stopper surfaces 21b, 23b are provided at a position small in a radial direction from the rotational center of the adjacent link parts 12, 12 so that the former come in contact with the first-stage straight-line attitude maintaining stoppers 21a, 23a, and the second-stage straight-line attitude maintaining stopper surface 22b is provided at a position large in a radial direction from said rotational center so that the former comes in contact with the second-stage straight-line attitude maintaining stopper 22a. That is, let R1, R3 be the average radius of the contact surface between the first-stage straight-line attitude maintaining stoppers 21a, 23a and the first-stage straight-line attitude maintaining stopper surfaces 21b, 23b, and R2 be the average radius of the contact surface between the second-stage straight-line attitude maintaining stopper 22a and the second-stage straight-line attitude maintaining stopper surface 22b, a relationship of R1<R2 and R3<R2 is established. In the case of the present embodiment, R1 is substantially the same as R3.

Figure 3:
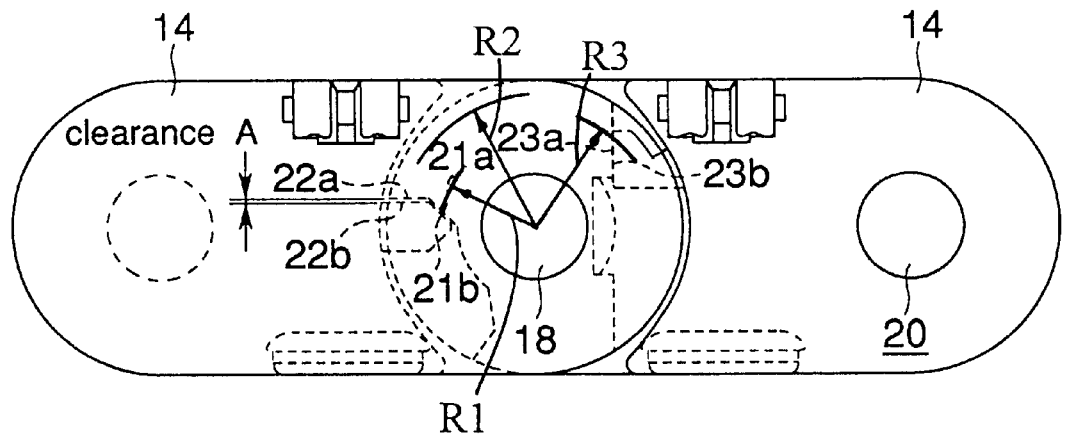
FIG. 3 is a side view when a pair of adjacent link parts are in the straight-line attitude.

As shown in FIG. 3, when the first-stage straight-line attitude maintaining stoppers 21a, 23a and the first-stage straight-line attitude maintaining stopper surfaces 21b, 23b start to contact with each other, the second-stage straight-line attitude maintaining stopper 22a is parted from the second-stage straight-line attitude maintaining stopper surface 22b with a predetermined clearance A. The size of the clearance A is smaller than an amount of elastic deformation at the contact between the first-stage straight-line attitude maintaining stoppers 21a, 23a and the first-stage straight-line attitude maintaining stopper surfaces 21b, 23b.

Accordingly, when the adjacent link parts 12, 12 rotate with each other and reach a straight-line attitude, the first-stage straight-line attitude maintaining stoppers 21a, 23a and the first-stage straight-line attitude maintaining stopper surfaces 21b, 23b first come in contact with each other. At this time, the first-stage straight-line attitude maintaining stoppers 21a, 23a and the first-stage straight-line attitude maintaining stopper surfaces 21b, 23b impinge upon with each other relatively slowly at a position in which the average radius is small. The impingement velocity V is V=R1·ω or V=R3·ω, and a contact noise caused by the impingement at a position in which the average radius is small. Thereafter, the first-stage straight-line attitude maintaining stoppers 21a, 23a and the first-stage straight-line attitude maintaining stopper surfaces 21b, 23b produce an elastic deformation so that a clearance between the second-stage straight-line attitude maintaining stopper 22a and the second-stage straight-line attitude maintaining stopper surface 22b disappears, and finally, the second-stage straight-line attitude maintaining stopper 22a and the second-stage straight-line attitude maintaining stopper surface 22b come in contact with each other at a position in which the average radius is large.

After the contact between the second-stage straight-line attitude maintaining stopper 22a and the second-stage straight-line attitude maintaining stopper surface 22b, both the first-stage straight-line attitude maintaining stoppers 21a, 23a and the first-stage straight-line attitude maintaining stopper surfaces 21b, 23b, and the second-stage straight-line attitude maintaining stopper 22a and the second-stage straight-line attitude maintaining stopper surface 22b resist against the bending of the adjacent link parts 12, 12. Moment M for limiting the bending is M=(F1·R1)+(F2·R2)+(F3·R3) whereby the rigidity with respect to the straight-line attitude of the guide and support chain 10 is promoted.

Since the first-stage straight-line attitude maintaining stoppers 21a, 23a and the first-stage straight-line attitude maintaining stopper surfaces 21b, 23b are provided at a position in which the average radius is small, in the case where the same moment exerts thereon, the force exerting on the contact surface becomes large. Accordingly, the large elastic deformation can be expected, and it is easy to control the clearance between the second-stage straight-line attitude maintaining stopper 22a and the second-stage straight-line attitude maintaining stopper surface 22b in a predetermined range.

Preferably, after the generation of the contact noise caused by the impingement resulting from the contact between the first-stage straight-line attitude maintaining stoppers 21a, 23a and the first-stage straight-line attitude maintaining stopper surfaces 21b, 23b, the second-stage straight-line attitude maintaining stopper 24a and the second-stage straight-line attitude maintaining stopper surface 24b come in contact with each other quickly to promote the rigidity of the guide and support chain 10 in the straight-line attitude. Accordingly, the clearance is preferred to be small.

Bending attitude limiting stoppers 24a, 25a are provided internally of the other end of the left and right side plates 14, 14. The bending attitude limiting stoppers 24a, 25a are projected from the internal sides. Bending attitude limiting stopper surfaces 24b, 25b are provided externally of one end of the left and right side plates 14, 14. The bending attitude limiting stopper surfaces 24b, 25b are depressed from the external sides. In the case where the adjacent link parts 12, 12 are connected, the bending attitude limiting stoppers 24a, 25b and the bending attitude limiting stopper surfaces 24b, 25b come in contact with each other to thereby prevent the adjacent link parts 12, 12 from being rotated in excess of a predetermined angle.

The bending attitude limiting stopper comprises a first-stage bending attitude limiting stopper 24a and a second-stage bending attitude limiting stopper 25a. The bending attitude limiting stopper surface comprises a first-stage bending attitude limiting stopper surfaces 24b and a second-stage bending attitude limiting stopper surface 25b. The first-stage bending attitude limiting stopper 24a is provided at a position small in a radial direction from the rotational center of the adjacent link parts 12, 12, and the second-stage bending attitude limiting stopper 25a is provided at a position large in a radial direction from said rotational center. The first-stage bending attitude limiting stopper surfaces 24b are provided at a position small in a radial direction from the rotational center of the adjacent link parts 12, 12 so that the former comes in contact with the first-stage bending attitude limiting stopper 24a, and the second-stage bending attitude limiting stopper surface 25b is provided at a position large in a radial direction from said rotational center so that the former comes in contact with the second-stage bending attitude limiting stopper 25a. That is, let R4 be the average radius of the contact surface between the first-stage bending attitude limiting stopper 24a and the first-stage bending attitude limiting stopper surface 24b, and R5 be the average radius of the contact surface between the second-stage bending attitude limiting stopper 25a and the second-stage bending attitude limiting stopper surface 25b, a relationship of R4<R5 is established.

Figure 4:
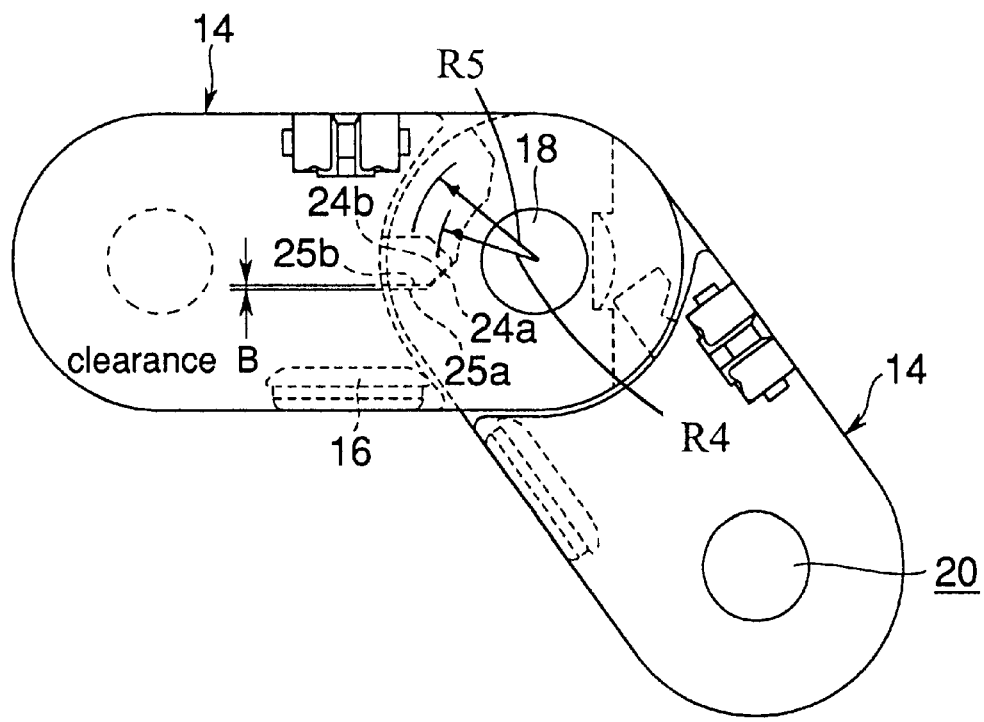
FIG. 4 is a side view when a pair of adjacent link parts are in the bending attitude.

As shown in FIG. 4, when the first-stage bending attitude maintaining stopper 24a and the first-stage bending attitude limiting stopper surface 24b start to contact with each other, the second-stage bending attitude limiting stopper 25a is parted from the second-stage bending attitude limiting stopper surface 25b with a predetermined clearance B. The size of the clearance B is smaller than an amount of elastic deformation at the contact between the first-stage bending attitude limiting stopper 24a and the first-stage bending attitude limiting stopper surfaces 24b.

Accordingly, when the adjacent link parts 12, 12 rotate with each other and reach an inclined angle, the first-stage bending attitude limiting stoppers 24a and the first-stage bending attitude limiting stopper surface 24b first come in contact with each other. At this time, the first-stage bending attitude limiting stopper 24a and the first-stage bending attitude limiting stopper surface 24b impinge upon with each other relatively slowly at a position in which the average radius is small. The impingement velocity V is V=R4·ω, and a contact noise caused by the impingement at a position in which the average radius is small. Thereafter, the first-stage bending attitude limiting stoppers 24a and the first-stage bending attitude limiting stopper surface 24b produce an elastic deformation so that a clearance between the second-stage bending attitude limiting stopper 25a and the second-stage bending attitude limiting stopper surface 25b disappears, and finally, the second-stage bending attitude limiting stopper 25a and the second-stage bending attitude limiting stopper surface 25b come in contact with each other at a position in which the average radius is large.

After the contact between the second-stage bending attitude limiting stopper 25a and the second-stage bending attitude limiting stopper surface 25b, both the first-stage bending attitude limiting stopper 24a and the first-stage bending attitude limiting stopper surface 24b, and the second-stage bending attitude limiting stopper 25a and the second-stage bending attitude limiting stopper surface 25b resist against the bending of the adjacent link parts 12, 12. Moment M for limiting the bending is M=(F4·R4)+(F5·R5) whereby the rigidity with respect to the bending of the guide and support chain 10 is promoted, and the guide and support chain is protected from being disassembled and broken.

Since the first-stage bending attitude limiting stoppers 24a and the first-stage bending attitude limiting stopper surface 24b are provided at a position in which the average radius is small, in the case where the same moment exerts thereon, the force exerting on the contact surface becomes large. Accordingly, the large elastic deformation can be expected, and it is easy to control the clearance between the second-stage bending attitude limiting stopper 25a and the second-stage bending attitude limiting stopper surface 25b in a predetermined range.

Preferably, after the generation of the contact noise caused by the impingement resulting from the contact between the first-stage bending attitude limiting stopper 24a and the first-stage bending attitude limiting stopper surface 24b, the second-stage bending attitude limiting stopper 25a and the second-stage bending attitude linumtng stopper surface 25b come in contact with each other quickly to promote the rigidity of the guide and support chain 10 to resist against the bending. Accordingly, the clearance is preferred to be small.

Figure 5:
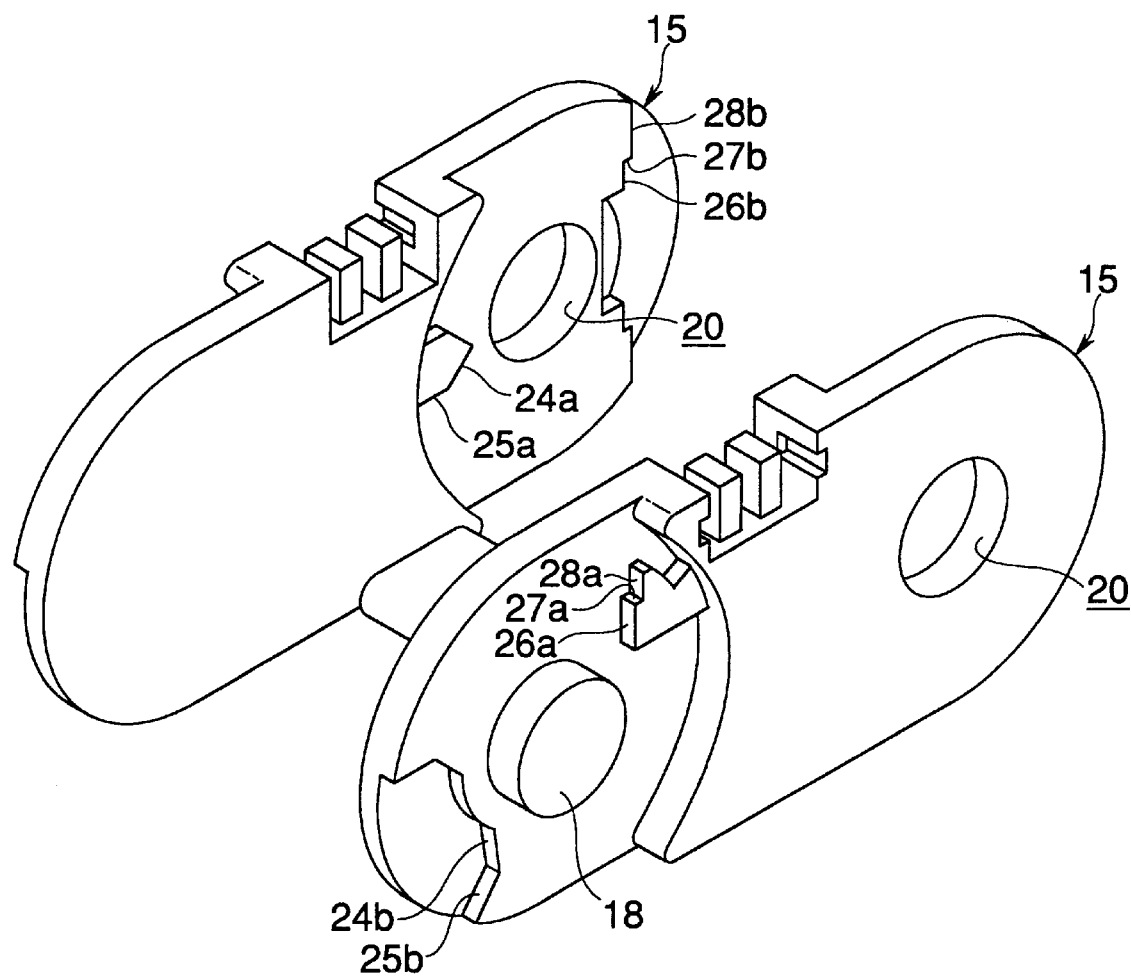
FIG. 5 is a perspective view of a link part of a second embodiment of the guide and support chain.
Figure 6:
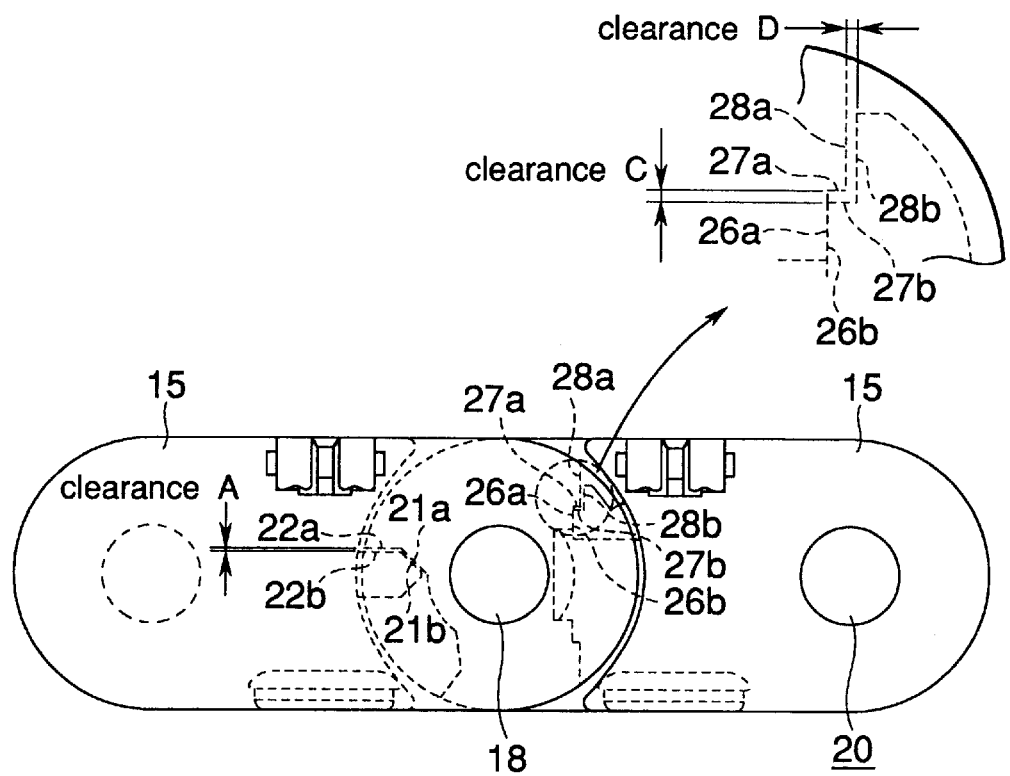
FIG. 6 is a side view when a pair of adjacent link parts are in the straight-line attitude.
Figure 7:
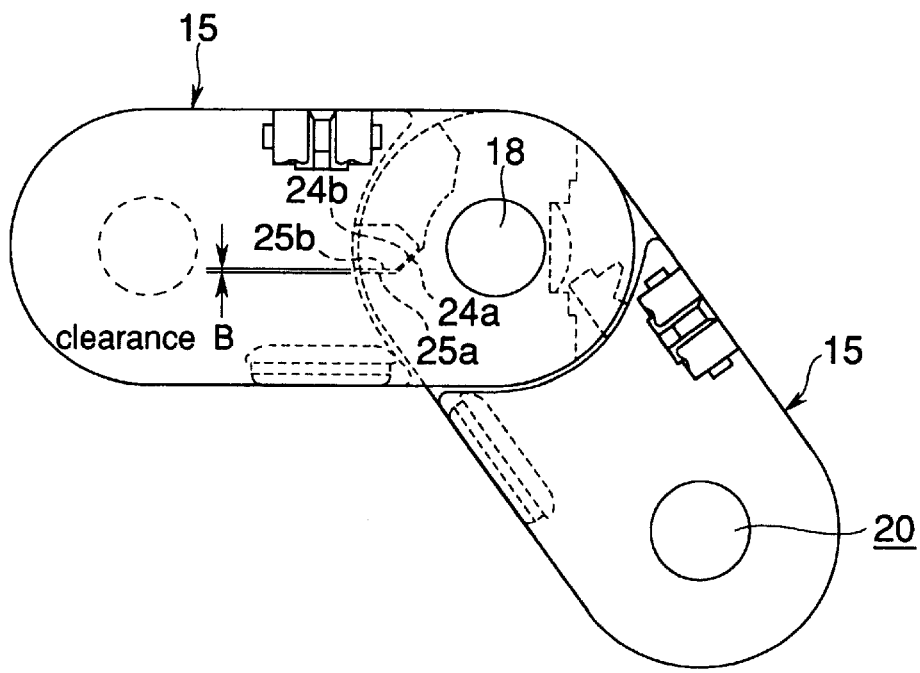
FIG. 7 is a side view when a pair of adjacent link parts are in the bending attitude.

FIGS. 5 to 7 show a second embodiment of the guide and support chain according to the present invention. In the present embodiment, there is shown a guide and support chain in which a straight-line attitude maintaining stopper provided on the external surfaces of side plates 15, 15 and a straight-line attitude maintaining stopper provided on the internal surfaces of side plates are modified. In the present embodiment, the bending attitude limiting stoppers 24a, 25a and the bending attitude limiting stopper surfaces 24b, 25b are the same as those shown in the first embodiment, but the external straight-line attitude maintaining stopper comprises a first-stage straight-line attitude maintaining stopper 26a and two second-stage straight-line attitude maintaining stoppers 27a, 28a, and the internal straight-line attitude maintaining stopper surface comprises a first-stage straight-line attitude maintaining stopper surface 26b and two second-stage straight-line attitude maintaining stopper surfaces 27b, 28b. Other reference numerals denote the same members as those shown in the first embodiment.

The first-stage straight-line attitude maintaining stopper 26a and the first-stage straight-line attitude maintaining stopper surface 26b come in contact with each other at a position in which the average radius is small, and the second-stage straight-line attitude maintaining stoppers 27a, 28a and the second-stage straight-line attitude maintaining stopper surfaces 27b, 28b come in contact with each other at a position in which the average radius is large. That is, let R6 be the average radius of the contact surface between the first-stage straight-line attitude maintaining stopper 26a and the first-stage straight-line attitude maintaining stopper surface 26b, and R7, R8 be the average radius of the contact surface between the second-stage straight-line attitude maintaining stoppers 27a, 28a and the second-stage straight-line attitude maintaining stopper surfaces 27b, 28b, a relationship of R6<R7 and R6<R8 is established. Other constitutions are the same as those shown in the first embodiment.

Since in the present embodiment, the first-stage straight-line attitude maintaining stopper in the external straight-line attitude maintaining stopper is extremely small in average diameter close to tie rotational, as compared with the first embodiment, the contact noise caused by the impingement between the first-stage straight-line attitude maintaining stopper and the first-stage straight-line attitude maintaining stopper surface can be reduced.

While in the above-described embodiments, a description has been made of the guide and support chain comprising the first- and second stoppers and the stopper surfaces with N=2, it is to be noted that the stoppers may be placed in contact with the stopper surfaces sequentially stepwise with the time shifted from the side close to the rotational center with N in excess of 3.

EFFECT OF THE INVENTION

A first . . . N stages of straight-line attitude maintaining stoppers and straight-line attitude maintaining stopper surfaces are sequentially formed as the radius from the rotational center of the side plates of the adjacent link parts increases, and when the n-stage straight-line attitude maintaining stopper and straight-line attitude maintaining stopper surface come in contact with each other, a clearance is provided between the n+1 stage straight-line attitude maintaining stopper and the n+1 stage straight-line attitude maintaining stopper surface. Thereby, when the guide and support chain takes a straight-line attitude, the first stage straight-line attitude maintaining stopper formed at a position small in radius is placed in contact with the first stage straight-line attitude maintaining stopper surface, and thereafter, the 2nd . . . N stage straight-line attitude maintaining stoppers formed at a position large in radius are placed in contact with the 2nd . . . N stage straight-line attitude maintaining stopper surfaces sequentially stepwise with the time shifted. Accordingly, the impingement speed of the first stage straight-line attitude maintaining stopper and the first stage straight-line attitude maintaining stopper surface can be delayed, and the noise generated in the contact surface is reduced. In addition, the 2nd . . . N stage straight-line attitude maintaining stoppers formed at a position large in radius are placed in contact with the 2nd . . . N stage straight-line attitude maintaining stopper surfaces to compensate for the disadvantage of the case where the contact is made at a position small in radius, to promote the rigidity of the guide and support chain, and to maintain the predetermined straight-line attitude. That is, the stoppers and the stopper surfaces anticipated in the impingement and the stoppers and the stopper surfaces anticipated in the rigidity are separately provided, the stoppers and the stopper surfaces anticipated in the impingement are provided at a position small in radium and the stoppers and the stopper surfaces anticipated in the rigidity are placed in contact with each other while being sequentially delayed to thereby suppress the noise, improve the rigidity at the tie of the straight-line attitude and maintain the moving locus of the guide and support chain.

A first . . . N stages of bending attitude limiting stoppers and bending attitude limiting stopper surfaces are sequentially formed as the radius from the rotational center of the side plates of the adjacent link parts increases, and when the n-stage bending attitude limiting stopper and bending attitude limiting stopper surface come in contact with each other, a clearance is provided between the n+1 stage bending attitude limiting stopper and the n+1 stage bending attitude limiting stopper surface. Therefore, when the guide and support chain takes a bending attitude, the first stage bending attitude limiting stopper formed at a position small in radius is placed in contact with the first stage bending attitude limiting stopper surface, and thereafter, the second . . . N stage bending attitude limiting stoppers formed at a position large in radius are placed in contact with the second . . . N stage bending attitude limiting stopper surfaces sequentially stepwise with the time shifted. Accordingly, the impingement speed of the first stage bending attitude limiting stopper and the first stage bending attitude limiting stopper surface can be delayed, and the noise generated in the contact surface is reduced. In addition, the 2nd . . . N stage bending attitude limiting stoppers formed at a position large in radius are placed in contact with the 2nd . . . N stage bending attitude limiting stopper surfaces to compensate for the disadvantage of the case where the contact is made at a position small in radius, to promote the rigidity of the guide and support chain, and to prevent the guide and support chain from being disassembled or broken to maintain a predetermined bending attitude. That is, the stoppers and the stopper surfaces anticipated in the impingement and the stoppers and the stopper surfaces anticipated in the rigidity, disassembling and protection of breakage are separately provided, the stoppers and the stopper surfaces anticipated in the impingement are provided at a position small in radius and the stoppers and the stopper surfaces anticipated in the rigidity are placed in contact with each other while being sequentially delayed to thereby suppress the noise, improve the rigidity at the time of the straight-line attitude and maintain the moving locus of the guide and support chain.

What is claimed is:

1. A guide and support chain comprising:
  a plurality of link parts connected together forming a storing space for flexible members,
  link parts in which upper and lower edges of a pair of left and right side plates are laterally disposed,
  said side plates of said adjacent link parts being superimposed widthwise to each other and rotatably connected,
  each of said side plates of each link part of said adjacent link parts being formed with a plurality of straight-line attitude maintaining stoppers and stopper surfaces for maintaining said link parts in a straight-line attitude,
  each of said side plates of each link part of said adjacent link parts being formed with a plurality of bending attitude stoppers and bending attitude stopper surfaces for limiting the bending attitude of said parts,
  each of said plurality of straight-line attitude stoppers sequentially engaging each of said plurality of said straight line attitude stopper surfaces, and,
  each of said plurality of bending attitude stoppers sequentially engaging each of said bending attitude stopper surfaces.

2. A guide and support chain comprising:
  a plurality of link parts connected together forming a storing space for flexible members,
  link parts in which upper and lower edges of a pair of left and right side plates are laterally disposed,
  said side plates of said adjacent link parts being superimposed widthwise to each other and rotatably connected, and,
  each of said side plates of each link part of said adjacent link parts being formed with first, second and third straight-line attitude maintaining stoppers and with first, second and third straight-line attitude stopper surfaces for maintaining said link parts in a straight-line attitude, and,
  said first and said second straight-line attitude maintaining stoppers engaging said first and said second straight-line attitude stopper surfaces elastically deforming said link parts followed by the engagement of said third straight-line attitude stopper with said third stopper surface.

3. A guide and support chain comprising:
  a plurality of link parts connected together forming a storing space for flexible members,
  link parts in which upper and lower edges of a pair of left and right side plates are laterally disposed,
  said side plates of said adjacent link parts being superimposed widthwise to each other and rotatably connected,
  each of said side plates of each link part of said adjacent link parts being formed with a first and second bending attitude stoppers and bending attitude stopper surfaces for limiting the bending attitude of the link parts, and,
  said first and said second bending attitude stopper sequentially engaging said first and second bending attitude stopper surfaces.

4. A guide and support chain as claimed in claim 2 wherein said adjacent link parts are rotatably moveable with respect to each other about a center of rotation, said first straight-line attitude stopper engages said first attitude stopper surface at a first average radius, said second straight-line attitude stopper engages said second attitude stopper surface at a second average radius, and, said third straight-line attitude stopper engages said third attitude stopper surface at a third average radius.

5. A guide and support chain as claimed in claim 4 wherein said first average radius is less than said second average radius and said second average radius is less than said third average radius.

6. A guide and support chain as claimed in claim 3 wherein said adjacent link parts are rotatably moveable with respect to each other about a center of rotation, said first bending stopper engages said first bending stopper surface at a first average radius, and, said second bending stopper engages said second bending stopper at a second average radius.

7. A guide and support chain as claimed in claim 6 wherein said first average radius is less than said second average radius.

8. A guide and support chain as claimed in claim 4 wherein said first and second average radii are equal to each other and less than said third average radius.

9. A guide and support chain as claimed in claim 5 wherein said first and second stoppers engage said first and second surfaces at a first impingement velocity which is a function of the average radii elastically deforming said adjacent link parts so as to permit said third stopper and said third stopper surface to engage.

10. A guide and support chain comprising:
  a pair of adjacent link parts;
  each of said pair of adjacent link parts includes a pair of side plates;
  each of said side plates includes a rotational center;
  each of said pair of side plates includes a plurality of stoppers and stopper surfaces engageable to limit the rotational angle between said adjacent link parts;
  said stoppers and stopper surfaces each having a different average distance from said rotational center of said side plate so that engagement of said stopper and stopper surface pairs occurs successively in order from said smallest average distance from said rotational center to said largest average distance from rotational center; and,
  a clearance existing between the next successive stopper and stopper surface upon engagement of any one of said stopper and stopper surface pairs.

* * * * *